United States Patent [19]

Mead et al.

[11] 3,786,315

[45] Jan. 15, 1974

[54] ELECTROLUMINESCENT DEVICE

[75] Inventors: Carver A. Mead, Pasadena; James O. McCaldin, South Pasadena, both of Calif.

[73] Assignee: Intel Corporation, Mountain View, Calif.

[22] Filed: Apr. 3, 1972

[21] Appl. No.: 240,490

Related U.S. Application Data

[63] Continuation of Ser. No. 851,906, Aug. 21, 1969, abandoned.

[52] U.S. Cl. .. 317/234 R, 317/235 N, 317/235 AQ, 313/108 D

[51] Int. Cl. .......................... H01l 3/00, H05b 33/00

[58] Field of Search ................ 317/235 B, 235 AQ, 317/235 N

[56] References Cited

UNITED STATES PATENTS

| | | | |
|---|---|---|---|
| 3,492,548 | 1/1970 | Goodman | 317/235 |
| 3,614,551 | 10/1971 | Jenkins et al. | 317/234 |
| 3,287,611 | 11/1966 | Bockemuehl | 317/235 |
| 3,390,311 | 3/1967 | Aven et al. | 317/237 |
| 3,515,954 | 6/1970 | Marujama | 317/234 |

*Primary Examiner*—Martin H. Edlow

*Attorney*—Lindenberg, Freilich, & Wasserman

[57] ABSTRACT

A direct current electroluminescent device for room temperature generation of blue and green light at low voltages and power levels, comprising a body of n-type zinc sulfide of low resistivity and high luminescent efficiency containing a first surface region treated to form an ohmic electron injection contact and a second region treated to contain within a thin layer of below 1 micron at least $10^{17}$ $cm^{-3}$ of a Group I metal hole injection states which have an energy level intermediate the valence band of zinc sulfide and the Fermi level of a metal contact electrode and states which generate under bias a net negative charge within the layer.

An electronegative metal electrode is applied to the layer and a relatively electropositive metal electrode is applied by to the first surface region. When a forward bias is applied to the device, electrons are injected into the first region and the net negative charge generated in the layer raises the energy of the hole injection states toward the metal Fermi level to permit hole injection. The injected holes and electrons combine at recombination centers in sufficient numbers at room temperature to emit radiation visible under ordinary illumination.

7 Claims, 7 Drawing Figures

*INVENTORS.*
CARVER A. MEAD
JAMES O. McCALDIN
*BY*
Lindenberg & Freilich
ATTORNEYS.

INVENTORS
CARVER A. MEAD
JAMES O. McCALDIN

BY Lindenberg & Freilich

ATTORNEYS.

ELECTROLUMINESCENT DEVICE

This is a continuation of application Ser. No. 851,906, filed Aug. 21, 1969, now abandoned.

BACKGROUND OF THE INVENTION

1. Field of the Invention

The present invention relates to electroluminescent devices and more particularly, to solid state devices which emit significant quantities of light at low power level and at room temperature. The invention further relates to processes of generating light in such devices and to processes of manufacturing the devices.

2. Description of the Prior Art

Solid state electroluminescent devices have many potential applications. For example, these devices can be embodied in electronic circuits to provide an indication of the logic or function of the circuitry. Furthermore, currently a substantial effort to develop devices which could be incorporated in an array to provide a digital display of complex images is in progress. This array could serve as an output interface between a computer and a human being. Gaseous light-emitting devices that are available are operated at high voltages and require special and costly transistors and circuits to power them. The cost per numeral at the present state of the art renders the construction and operation of an instrument expensive.

Much of the recent effort has been directed to generation of light in solid state semiconductor-type of devices. Electrons and holes are generated within the device and recombine to release a quantum of energy in the form of a photon having a wavelength within the visible range. The eye is most efficient when viewing blue or green light having a wavelength of less than about 5600 Angstroms. Present devices emitting light at these wavelengths can be operated only at very low temperatures.

However, the devices or materials that have reasonable efficiencies at room temperature generally emit radiation of wavelengths longer than 6,500 Angstroms. The efficiency of the human eye is only about 10 percent when viewing light having a wavelength of 6550 Angstroms. When viewing light radiating at wavelengths close to 7,000 Angstroms and again at wavelengths shorter than about 4,000 Angstroms, the efficiency of the eye is very low.

If devices emitting light at room temperature in the range in which the eye is between 50 and 100 percent efficient, could be processed so as to be compatible with standard transistor voltages and integrated circuit parameters, operating efficy and reliability of the display would be improved. Furthermore, the ability to emit light in this region would permit color variation of the light in the visible region from red to yellow to green to blue to provide multicolor displays. An enormous quantity of information can be conveyed by means of color.

OBJECTS AND SUMMARY OF THE INVENTION

Therefore, an object of this invention is to produce at room temperature and at a low power level light over the range of the visible region at which the eye is most efficient.

A further object of the invention is to provide new and improved electroluminescent devices which generate blue and green light at room temperatures.

Another object of the invention is the generation of light at low power levels in crystalline wide band gap semiconductor materials.

A still further object of the invention is to provide hole injection at low voltage and low power levels into a wide band gap, high luminescent efficiency semiconductors such as zinc sulfide.

These and other objects and many attendant advantages of the invention will become readily apparent as the description proceeds.

In accordance with the invention an electroluminescent device having high luminescent efficiency at room temperature comprises a body of a low resistivity, crystalline semiconductor of a first conductivity type having a wide band gap. The crystalline body is of high purity but contains a controlled doping of deep luminescent recombination centers having an ionization energy high enough that the probability of thermally exciting trapped carriers out of the center at room temperature is small.

The body further contains a first surface region for injection of majority carriers and a second thin surface region for injecting minority carriers into the body. On application of a low forward bias voltage of below 10 volts and preferably below 5 volts to the first and second regions, both types of carriers are injected into the body and recombined at the centers to release energy in the form of radiated visible light at wavelengths at which the human eye is very efficient. In fact, devices have been operated at applied voltages below the band gap of zinc sulfide.

The novel features of the invention are set forth with particularity in the appended claims. The invention will best be understood from the following description when read in conjunction with the accompanying drawings.

DESCRIPTION OF THE PREFERRED EMBODIMENTS

Photons having energies of approximately 1.8 eV are required for visible radiation in the red, photons having energies of about 2.3 are required for green emission and of about 2.8 eV for blue emission. Electroluminescence relies on radiative transitions for light output and the maximum attainable photon energy of the light emitted is directly dependent on the band gap width of the compound forming the body of the device.

Figure 1:
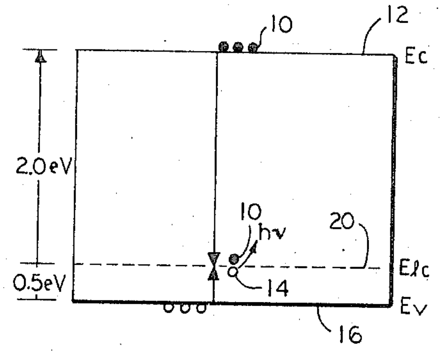
FIG. 1 is a schematic energy diagram of a typical wide band gap luminescent material.

Referring now to FIG. 1 the energy diagram of a typical wide band gap, electroluminescent semiconductor is illustrated. The band gap is measured as the difference between the energy $E_c$ of an electron 10 in the conduction band 12 and the energy $E_v$ of a hole 14 in the valence band 16. In a wide band gap material, direct recombination of the two free carrier is highly unlikely as there are many other mechanisms which nonradiatively dissipate the energy of free carriers.

No appreciable number of states exist in the region between the conduction and valence bands; this region being known as the forbidden gap. However defect or impurity states known as centers can be introduced into the forbidden gap by deliberately treating or doping the semi-conductor. Centers may be introduced at a shallow or deep energetic level.

Luminescent centers are capable of capturing and trapping a free carrier until an oppositely charged carrier arrives, recombines with the trapped carrier in a manner favoring a visible radiative transition. Radiative processes are rendered more probable by introducing the luminescent centers at a deep level. Then the trapped electron or hole is not as likely to be thermally excited out of the center 20 at room temperature, without radiative recombination. The energy of the center $E_{1c}$ should be greater than about 0.5 eV from the nearest band edge and is preferably no more than about 1.5 eV from the band edge.

The center 20 is usually a hole trap and the preferred transition is usually considered to involve trapping of a hole 14 in a luminescent recombination center 20 near the valence band edge, the subsequent entry of an electron 10 from the conduction band or a shallow donor into the trap which results in the recombination of the carriers and emission of a quantum of radiation having energy, $h\nu$ essentially equal to the band gap energy less the trap energy. Therefore, the band gap of the compound forming the body of the device must be at least about 2.3 eV in order to provide transitions sufficiently energetic to emit visible radiation and is preferably at least 3.0 eV to produce radiation over the wavelength range where the eye is the most efficient.

Compounds formed from a Group II metal and a Group VI anion having minimum band gaps in this range are suitable materials for use in the invention. Zinc sulfide is the most preferred material since it has a band gap of about 3.6 eV permitting attainment of a wide variety of color emissions. Color variation may be affected by introducing deeper or shallower recombination centers to affect the energy of the transition or by forming a body of mixed semi-conductor materials. For example, cadmium sulfide has a band gap of 2.4 eV. By combining cadmium sulfide and zinc sulfide, a mixed crystal can be formed having an average band gap of about 3.0 eV.

High luminescent efficiency zinc sulfide is formed as discussed by introducing a localized level capable of radiative recombination of free charge carriers. Metal impurities such as the Group I*b* metals, copper, silver or gold have been recognized to luminescently activate zinc sulfide when present alone or preferably in combination with coactivators such as halogens, e.g., chlorine, bromine or iodine, or a Group III*a* metal, for example, gallium, indium and aluminum.

There is also evidence that activator or coactivator impurities can form complex or compensated states with each other or may form a localized level by self-compensation with a lattice defect such as a sulfur or a zinc vacancy. This mechanism is believed responsible for the self-activated blue emission observed in coactivator doped zinc sulfide.

The usual assumptions as to the state of the introduced element do not necessarily hold true due to the strong tendency for compensation. Thus, aluminum, gallium and indium substituting for zinc normally would be expected to act as donors. However, in most cases the donor tendencies of these atoms are not evident since the atoms present in the crystal are compensated by zinc vacancies leading to the self-activated blue emission as well as making it difficult to produce highly conducting n-type material.

As another example of compensation, silver though usually considered an acceptor, has been identified as a complex donor center consisting of the acceptor associated with a doubly ionized sulfur anion vacancy and responsible for the orange silver emission.

The low-resistivity material comprises a high-purity crystalline wide band gap material doped with sufficient levels of donor or acceptor atoms to provide a resistivity in a range compatible with the desired voltage operating characteristics, that is, the resistivity should be less 100 ohm-cm so that at currents of the order of milliamps, the voltage drop in the bulk material is much less than the operating voltage drop in the electrode contact region. For zinc sulfide, a suitable donor material is a Group III*a* metal, such as aluminum, which is substitutionally introduced into the crystalline material in sufficient numbers to provide a free carrier concentration of at least $10^{15}$ electrons per cubic centimeter. Other states may be introduced to provide a high density of electrons, such as halogen substituted for a sulfur atom.

The above discussion has dealt with the internal bulk parameters and mechanisms which favor light emission by the recombination of free charge carriers. However, the major difficulty in development of room temperature solid state electroluminescent devices in wide band gap materials such as zinc sulfide which are capable of emitting light in the green or blue regions of the visible spectrum has been the introduction of minority carriers at low bias voltage into the bulk of the crystal.

Experimentally, visible radiation has been generated in zinc sulfide by reverse bias impact ionization of a solid to which electrodes are attached and by applying an alternating voltage to a cell consisting of a thin layer of a mixture of powdered phosphor and a dielectric binder between two planar electrodes. The latter process is inherently high voltage and though electroluminescence has been achieved in some reverse biased devices, the strong field has caused the ions to migrate the phenomenon irreversibly ceases after a short period of operation.

Traditionally, the least complicated way of injecting minority carriers into a crystal has utilized a p-n junction. This approach has been successful for some narrow band gap materials and efficient emission of long wavelength light in the red region has been obtained. However, for the wide band gap materials, this approach is neither thermodynamically nor electrically compatible with the properties of the material as will be described.

It is very difficult to render the wide band gap materials both n-and p-type, and thereby form the p-n junction electroluminescent devices according to the above-described techniques. The reason for this is that the band gap, e.g., 3.6 eV for ZnS, is substantially larger than the crystal binding energy, e.g., approximately 1 eV per atom. Consequently, during processing, crystal defects, such as vacancies, interstitials, etc., which are formed at energies of the same order of magnitude as binding energies, are favored over the formation of electronic carriers of opposite polarity to those normally present as such carriers require energies of the order of the band gap energy for their formation.

Formation of a conducting layer of opposite type of conductivity in a wide band gap material such as n-type zinc sulfide, does not in itself assure the introduction of carriers at low voltage. Carriers are introduced into the body of the device through contact electrodes usually formed of metal which are applied to the surfaces of the body of material. An energy barrier is created at the metal semi-conductor interface inhibiting the flow of carriers. Even if a p-n junction could be formed, it probably would not be recognized since the device would behave essentially as an insulator. In fact, the necessity of forming low voltage contacts is the cause of a major part of the difficulty in forming successful electroluminescent devices in wide band gap materials.

At the moment of forming an interface between a metal and a semiconductor, without bias, a barrier, $\Phi$, develops and the Fermi level of the metal is at a distance from the band edge such that neither electrons nor holes can be introduced into the semiconductor. This barrier is analogous to the work function between a vacuum and a metal interface. The barrier energies exhibited by zinc sulfide — metal interfaces have been found to be a function of the electronegativity of the metal employed. The barrier energies of various metal contacts on n-type zinc sulfide were investigated and reported by Aven and Mead at pp. 8–10 of Vol. 7, No. 1 of *Applied Physics Letters*, July 1, 1965.

Figure 2:
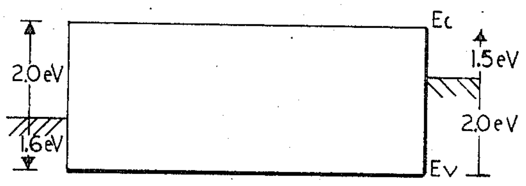
FIG. 2 is a schematic energy diagram illustrating the energy barriers of metal-zinc sulfide interfaces.

Referring now to FIG. 2, it is seen that interfaces between electropositive metals electroded to zinc sulfide exhibit a barrier of about 1 to 1.5 eV from the conduction band edge and the most electronegative metals still exhibit a barrier of about 1.5 eV from the valence band edge. With such high energy barrier energies, thermionic current is very small and the applied voltage would drop across the metal-semiconductor interface and would be much larger than the voltage appearing across the active region of the device.

Of the two carriers necessary for luminescent action, introduction of electrons into a body of zinc sulfide is easier to achieve since zinc sulfide can be processed to n-type conductivity more easily. By increasing the net donor density in the region of the body of zinc sulfide underlying an electropositive metal contact electrode above about $10^{17}$ $cm^{-3}$ and preferably above $10^{18}$ $cm^{-3}$ the contact exhibits ohmic characteristics and electrons are introduced into the device under low voltage forward bias. However, as discussed, it is very difficult to render zinc sulfide material highly conducting p-type. Therefore, it is not possible to narrow the width of the depletion layer underlying a hole injection contact electrode by introducing a very high population of holes. Furthermore, a metal does not exist with a sufficient electronegativity to lower the Fermi level to near the valence band edge. Neither of these techniques are utilized for hole injection in accordance with the present invention.

Hole injection is accomplished herein by specially treating the region of the zinc sulfide body underlying the contact electrode. This region is treated to introduce at least $10^{17}$ $cm^{-3}$ of states that generate under a low forward bias voltage a net negative charge in a very thin layer. The layer is preferably no more than 1,000 A in thickness and the net negative charge density is preferably at least $10^{18}$ $cm^{-3}$.

The hole injection process is enhanced enormously by providing an intermediate hole trapping state in the thin layer having a deep energy level below the Fermi level of the contact electrode. If the energy of the state or center is approximately halfway between the metal Fermi level and the valence band, then the holes can be injected directly into this state or into the valence band of the zinc sulfide. If the luminescent centers are hole traps having this energy state they may function as the intermediate state or a separate hole trap may be introduced at this level. For example, the complexed aluminum-anion vacancy recombination center may be utilized to enhance hole injection or an additional acceptor state such as silver may be introduced into the thin layer.

Figure 3:
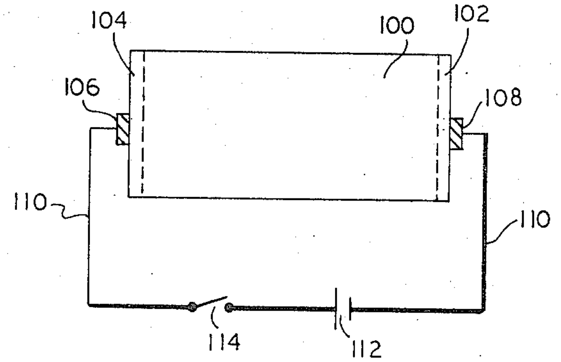
FIG. 3 is a schematic view of a zinc sulfide luminescent device according to the invention.

Referring now to FIG. 3, an electroluminescent device is fabricated from an n-type, low-resistivity zinc sulfide crystal of high luminescent efficiency. The crystal has a central region 100 of low resistivity. An electron injecting, ohmic contact region 102 is formed on one region of the surface of the crystal and a hole injection layer 104 is formed as a very thin layer on another region of the surface of the crystal. A contact electrode dot 106 of a very electronegative metal is formed on the region 104 and a contact electrode dot 108 of a relatively electropositive metal is formed on the region 102.

The electrode 106 is formed of a metal having an electronegativity as measured on the Pauling seale of no less than 1.8 8 eV such as gold, platinum, palladium, silver or copper. The electrode 106 is formed of a relatively electropositive metal having an electronegativity of less than 1.8 as measured on the Pauling seale such as indium, aluminum or magnesium.

Conductors 110 are connected to the electrodes 106 and 108 and to a potential source 112 through a switch 114. When the switch 114 is closed, a positive bias is applied to layer 104 and a negative bias is applied to region 102. Electrons are injected into region 102 and thence flow to region 100 and holes flow into layer 104. The electrons enter layer 104 from region 100 and are trapped to build up a net negative space charge of at least $10^{17}$ $cm^{-3}$ within the thin layer which raises the hole intermediate state to a level near the metal Fermi level, for example within 0.25 eV of the Fermi level and preferably above the metal Fermi level. Electrons combine with the injected holes at the recombination centers in sufficient numbers to emit radiation visible under ordinary illumination at room temperature.

The hole injecting process according to the invention does not entail large voltages, only a net negative space charge large enough to raise the energy of electrons in the valence band or intermediate hole trapping state toward the metal Fermi level. A 1.5 eV voltage difference between the valence band and Fermi level requires a charge of at least $10^{12}$ $e/cm^2$ or a field of $5\times10^5$ to $10^6$ volts per centimeter. If the layer thickness is below 1 micron the voltage drop is acceptable.

However, the positive voltage on electrode 106 tends to pull the electrons entering the layer 105 from the bulk of the body into the electrode 106. A barrier must be created to retard the electron flow through layer 104 so that the electrons will not leak past the layer 104 and enter the electrode 106. This is accomplished by providing a high density of electron traps that retard lowering the barrier to electron flow. A density of electron traps above about $10^{17}$ cm$^{-3}$ is sufficient to terminate the field in a distance such that the holes that enter the layer 104 radiatively recombine with electrons. The electron trapping states are preferably donor states which have a high capture cross-section for electrons and a small capture cross-section for holes to eliminate competition for the injected holes.

Figure 4:
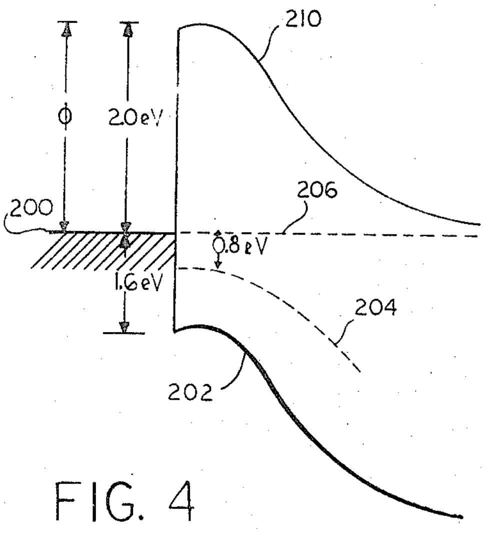
FIG. 4 is a further energy diagram of the hole injecting contact region and metal electrode interface before applying bias.

Referring now to FIG. 4, the energy diagram for a zinc sulfide electroluminescent device according to the invention is illustrated. The diagram is for the zero-bias condition. A contact electrode 200 such as gold exhibits a barrier $\Phi$ of about 2.0 eV and provides a difference of about 1.6 eV from the valence band 202 to the metal Fermi level 206. A surface region of the device has been treated to form a layer having a thickness below 1,000 A containing a hole trapping state e.g., silver at a level 204 intermediate the metal Fermi level 206 and the valence band 202. The layer further contains at least $10^{17}$ cm$^{-3}$ empty states that fill under bias to provide a net negative charge in the layer.

Figure 5:
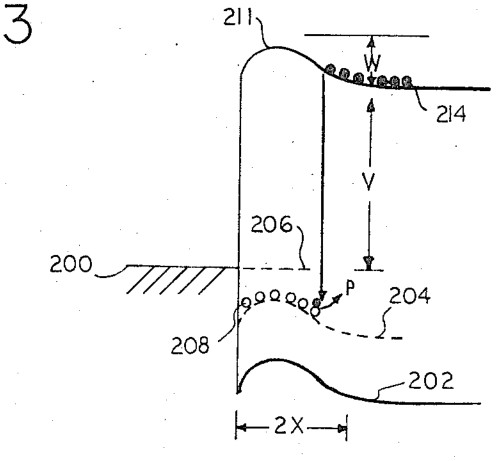
FIG. 5 is another energy diagram of the interface of FIG. 4 shown under forward bias.

Referring now to FIG. 5, under forward bias, the net negative charge in the layer raises the level 204 of the intermediate states near or above the Fermi level 206 of the metal. Holes 208 are injected into the intermediate state level 204 or directly into the valence band 202. Stated in another sense, electrons leave the valence band 202 or the states 204 directly and enter the metal of the contact electrode. The net negative charge in the layer also raises the conduction band 210 to maintain a barrier 211 having a height W and a width of 2x. The energy barrier W prevents the electrons 214 from flowing out of the layer. The electrons 214 from the conduction band combine with the holes 208 at luminescent centers to emit a photon, *p*. The radiative transition is at an energy sufficient to radiate visible light at room temperature.

The invention will now become better understood by reference to the following examples. It is to be understood that the examples are presented only for purposes of illustration and that numerous substitutions, alterations and modifications may readily be made by those skilled in the art without departing from the scope of the invention.

LOW RESISTIVITY ZINC SULFIDE

The low resistivity material comprises a body of high-purity crystal zinc sulfide doped with a sufficient level of donor atoms to provide a resistivity in a range compatible with the desired voltage operating characteristics, that is, the resistivity should be about 1 to 100 ohm-cm to that at applied voltages of below 15 volts and at current levels of 1 to 100 milliamps there is a very small voltage drop across the body of material. For zinc sulfide, a suitable donor material is a group III metal, such as aluminum, which is substitutionally introduced at a level of about 100 ppm into the crystal material and treated to provide a free carrier concentration of approximately $10^{17}$ electrons per cubic centimeter. The body may be in the form of a grown crystal or a film deposited onto a substrate.

As discussed before, zinc sulfide because of its wide band gap, is a very difficult material to treat. The typical form of aluminum-doped zinc sulfide is high resistivity, because the aluminum donors have been compensated or complexed with another deep center, most probably a zinc vacancy. The zinc vacancy acts as an acceptor and binds the extra electron present on the aluminum atom. Instead of the electron entering the conduction band, it is trapped in the center. The presence of zinc vacancies is further evidenced by very bright emission of blue light when the crystal is irradiated with ultra-violet photons. Therefore, the first processing step in the construction of the device is related to lowering the resistivity of the crystal body according to the following procedure.

EXAMPLE I

A 50 mil thick slice of Eagle Pitcher Crystal No. D686, a zinc sulfide crystal having an aluminum doping level of 100 parts per million corresponding to about $10^{19}$ aluminum atoms per cubic centimeter, was treated at high temperature in an environment containing zinc atoms. The environment may be either a zinc containing liquid or a zinc containing vapor. It is preferred to carry out the treatment in liquid because the large body of liquid zinc can also sequester impurities from the crystal as it introduces excess zinc atoms into the crystal to fill zinc vacancies. When the slice of crystal was treated in a body of liquid zinc at 800° C for 20 minutes the resistivity decreased from $10^5$ ohm-cm to less than 1 ohm-cm and the net concentration of donors was raised to about $10^{17}$ cm$^{-3}$. However, it is apparent that zinc vacancies remain since the carrier concentration is not as high as the aluminum doping level of $10^{19}$ cm$^{-3}$.

ELECTRON INJECTING ELECTRODE

The ohmic electron injecting contact is formed by introducing a net donor density of at least $10^{18}$ cm$^{-3}$, preferably of at least $10^{19}$ cm$^{-3}$ into a region underneath the metal contact. For example, sufficient number of zinc atoms can be replaced by an aluminum atom or other donor atom which contributes an electron to the crystal body. The processing should be conducted without the simultaneous introduction of vacancies or acceptor impurities.

The processing may be by various techniques such as the procedure reported by Aven and Mead in Volume 7, No. 1 *Applied Physics Letters*. This technique relies on the combination of very powerful chemical getter agents and a chemically etched zinc sulfide surface. Contacts with the best overall performance are obtained by etching the zinc sulfide crystal in pyrophosphoric acid at 250° C and immediately scribing indium contacts onto the phosphate phase with a liquid indium-mercury amalgam and firing at 350° C in a hydrogen atmosphere. However, even under these dorrosive conditions, the final contact is not always ohmic at room temperature. Furthermore, the technique will not work on a cleaved or mechanically prepared surface and the known photoresists are not capable of protecting the edges and back of the body of zinc sulfide during the treatment with pyrophosphoric acid.

It is therefore preferred to utilize the procedure described in co-pending application Ser. No. 824,898 filed Apr. 25, 1969 now U.S. Pat. No. 3,614,551. According to the latter procedure an ohmic electron injecting contact is formed on the surface of the zinc sulfide body by applying to the surface a group II metal or alloy thereof in the presence of a source of a donor precursor and heating the region to above the melting temperature of the metal or alloy. The donor precursor is preferably a group IIIa metal such as aluminum gallium or indium or a halogen such as Cl, Br, and I. The donor precursor must be present in the surface region in a density of at least $10^{17}$ $cm^{-3}$ before treatment or maybe substitutionally introduced into the rich surface region during the treatment by being present on the surface alloyed with the group II metal. A typical example follows.

EXAMPLE II

A slice of low resistivity n-type zinc sulfide crystal was mechanically cleaved from the material prepared in accordance with Example I. A surface region of the slice was mechanically etched in HCl at 50° C for 5 minutes. The etched surface was then scrubbed with an indium-mercury amalgam to wet the surface. A preformed slug of a slightly cadmium-rich indium-cadmium alloy was pressed onto the surface and the slice was heated on a platinum strip heater for 1 minute at 350°–450° C. The heating was conducted in an argon atmosphere. The slice was cooled to room temperature. The contact resistance of the electrode was measured and was found to exhibit a resistance of about 1 ohm-$cm^2$. The slug was in firm metalurgical contact with the surface.

HOLE INJECTING CONTACT LAYER

A thin semi-insulating hole injecting layer is provided in one procedure by introducing a very high density of a Group I metal into the layer for a short distance in a manner forming a very high density of states that generate a net negative charge of at least $10^{17}$ $cm^{-3}$ under forward bias to raise the level of the hole injection states and to retard the lowering of the barrier to electron flow. The Group I*b* metal such as silver can also form an acceptor which is an efficient hole trap having an energy of about 0.8 eV from the valence band and is therefore in an excellent position to aid hole injection.

Replacement of zinc atoms in the lattice with large densities of silver requires special processing to render the surface very zinc-poor so that the silver atoms may be introduced into the lattice in a very high density and to a very short depth. One processing technique according to the invention effects substitution of silver into the zinc lattice by use of a diffusion technique.

The surface of the zinc sulfide body is coated with a thin layer suitably about 50 to 100 angstroms thick of a source of silver or copper or mixtures thereof such as silver or copper metal or compounds thereof, suitably silver or copper sulfide. The slice of crystal is then placed on a platinum strip heater and heated rapidly to a temperature of about 650° C to 950° C suitably for less than a minute and is then cooled rapidly. Excess coating material is removed mechanically or with appropriate etchants.

Rapid cooling of the slice permits immediate transfixing of the material in a state in which the surface relaxes to retain the substitutionally introduced silver atoms at a density of $10^{19}$ $cm^{-3}$ in a very thin surface layer. The silver is introduced in a manner to form a high-resistivity, semi-insulating, thin layer which contains the states creating the net negative charge at low applied bias. The hole injecting contact processing is completed by evaporating a dot of a highly electronegative contact metal such as gold on to the layer. A typical example follows.

EXAMPLE III a. A film of silver, approximately 100A thick was evaporated onto a cleaved surface region of a low resistivity slice of zinc sulfide having a high luminescent efficiency prepared in accordance with Example I. The slice was placed in an argon atmosphere containing a small amount of sulfur vapor and heated at about 700° C on a platinum strip heater for 10 seconds and allowed to cool. Six mil diameter gold dots were evaporated onto the surface to complete the hole injecting contact. An ohmic electron injecting contact was then applied to the back surface of the slice according to the procedure of Example II.

b. A film of silver, approximately 1,000A thick was evaporated onto a cleaved surface of a low resistivity, slice of zinc sulfide prepared in accordance with Example I. The coated slice was heated at 700° C for about ten seconds on a platinum strip heater in an inert atmosphere such as argon and then allowed to cool. The silver remaining on the surface was removed by etching the surface with concentrated nitric acid. The processing was completed according to the procedure described in Example III *a*.

c. A thin layer of silver sulfide about 100A thick was applied to a cleaved surface of a low resistivity slice of zinc sulfide prepared in accordance with Example I. The coated slice was then placed in an inert atmosphere and heated at about 700° C on a platinum strip heater for ten seconds and allowed to cool. The processing was completed according to the procedure described in Example III*a*.

The device of Example III*a* when drawing 10 miliamps of current at 2.5 volts under forward bias radiated clear blue light which was clearly visible under normal room illumination.

Figure 6:
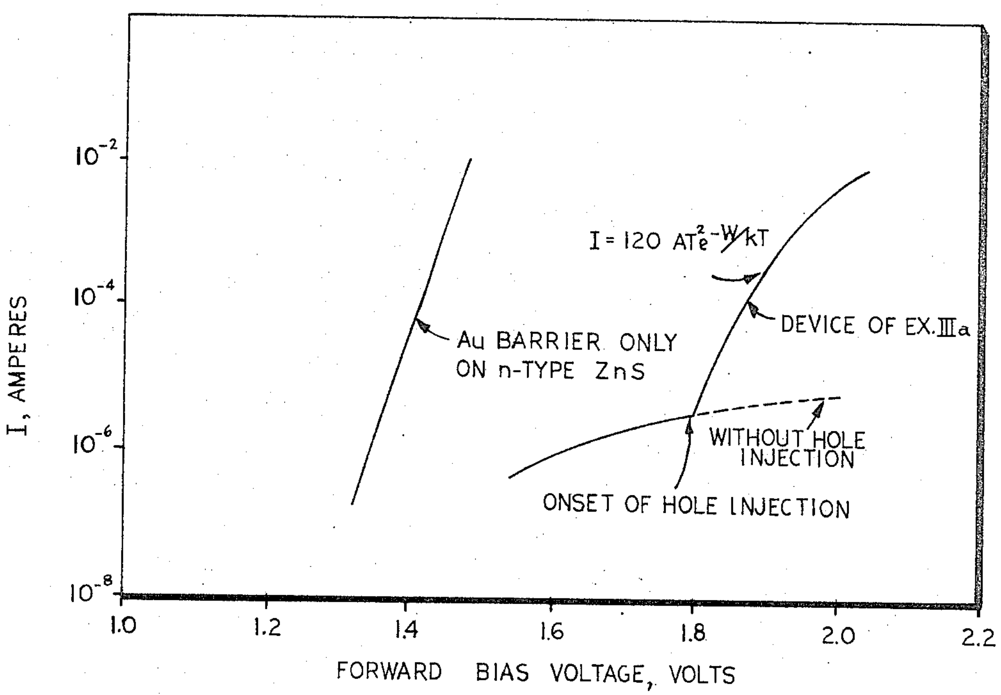
FIG. 6 is a set of current-voltage curves for a device and metal-zinc sulfide interface barrier according to the invention.

Referring now to FIG. 6, the current-voltage characteristic for the device of Example III is illustrated in comparison to the characteristics of the gold barrier alone. The gold barrier curve shows a linear increase of current with voltage from about 1.2 to 1.6 volts. The curve of the device of Example III illustrates a first region in which the current increases with bias up to a point at about 2 volts at which the onset of hole injections occurs and the slope of the curve increases dramatically.

The slope of the curve follows the relationship:

$I = 120\ AT^2\ e^{-W/kT}$ where:

$A$ is the area in $cm^2$ of the active device $T$ is the temperature; and $W$ is the height of the barrier to electron flow.

The active region of the device of Example III has a diameter of about 6 mils and the measured barrier W is therefore about 0.25 eV.

Figure 7:
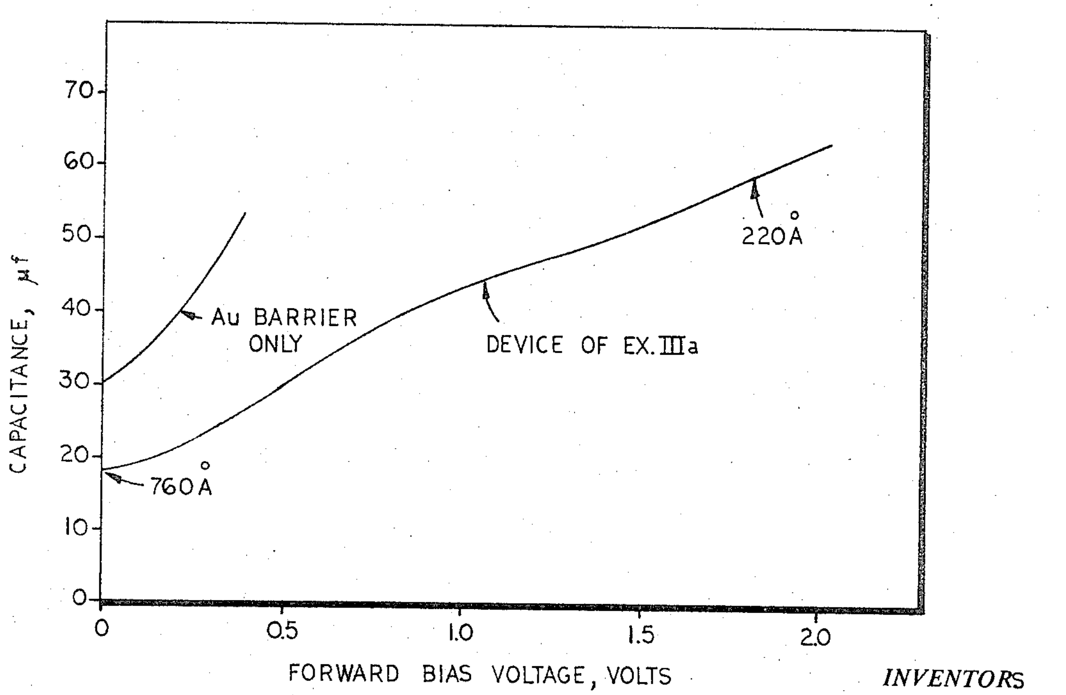
FIG. 7 is a set of capacitance-voltage curves for a device and metal-zinc sulfide interface according to the invention.

Referring now to FIG. 7, the voltage-capacitance characteristics of the device of Example III*a* are again compared to that of the gold barrier on a slice of untreated aluminum doped n-type conductivity zinc sulfide. The width of the depletion layer represented by the parabolic shaped barrier W is $2x$. The value of this width is determined from:

$$\epsilon A/C = 2x$$

$\epsilon$ is the permitivity of ZnS (about $10^{-12}$) where C is the capacitance in microfarads, $\mu f$; and $A$ is the active area of the device.

From FIG. 7 the width of the layer at an applied voltage of 2 volts is about 220A.

The net negative charge density, N, is then determined from the relationship:

$$qNx^2/2\epsilon + \Phi - V = W$$

at $\Phi = V =$ about 2 volts $$1.6 \times 10^{-19} \times N \times 10^{-12}/2 \times 10^{-12} = W = 0.25$$

N is therefore approximately $2.5 \times 10^{18}/\text{cm}^{-3}$ over a layer thickness of about 200A.

The efficiency of the device can be further improved by increasing the number or electron capture cross section of the electron trapping states in the thin region under the hole injecting contact dot to increase the height of the barrier. An electron trapping state that can be introduced to maintain the barrier to electron flow is silver paired with a sulfur vacancy. This state is a deep donor and when empty it is positive but when full is charge neutral. Therefore, it has little affinity for holes when full or empty.

The material may be further treated to introduce into the hole injecting layer a luminescent center such as copper having an energy level different from that of the intermediate state. A typical example follows:

EXAMPLE IV a. The procedure of Example III was repeated. Before the six mil gold dot was applied to the layer, a layer of copper sulfide about 100A thick was deposited on top of the silver doped layer and the crystal body heated on the pplatinum strip heater in an inert atmosphere at about 650° C for a few seconds. The gold dots were then applied. When the device was connected to a battery it radiated bright blue-green light at about the same power level as reported for the device of Example III.

b. The thickness of the copper sulfide layer was increased to 1,000A and the procedure of Example IV*a* repeated with the additional step of removing the copper sulfide remaining on the surface with an $NH_4OH$ etch before applying the gold dots. The device radiated bright blue-green light at about the same power level as reported in Example III*a*.

c. A 1,000A thick layer of copper sulfide was directly applied to a cleaved surface of a slice of crystal treated in accordance with Example I. The coated slice was placed on a platinum strip heater and heated in an inert atmosphere at about 500° C for a few seconds. The copper sulfide remaining on the surface was removed with $NH_4OH$. The device radiated bright green light at about the same power level as reported in Example III*a*.

It is to be understood that the foregoing relates only to preferred embodiments of the invention and that numerous substitutions, modifications and alterations are all permissible without departing from the spirit and scope of the invention as defined in the following claims.

What is claimed is:

1. A direct current forward biased, electroluminescent diode device comprising:

a body of n-type zinc sulfide having a resistivity below 100 ohm cm, a band gap of at least 3.0 eV, and at least $10^{17}$ cm$^{-3}$ donor atoms throughout said body, and two opposite surfaces;

means forming an ohmic electron injecting contact on one of said two opposite surfaces, means forming a hole injecting contact over a region on the other of said two opposite surfaces, and said body of zinc sulfide having a chemically formed electron barrier layer including metal atom recombination centers in the region of said body immediately underlying the region of said hole injecting contact, said barrier layer having a thickness of less than 1,000 angstroms, containing a concentration of at least $10^{17}$ cm$^{-3}$ donor atoms, and a similar order of a concentration of acceptor atoms.

2. A diode device as recited in claim 1 wherein said metal atoms are silver metal atoms.

3. A diode device as recited in claim 1, wherein the donor atoms in said n-type zinc sulfide body are aluminum atoms.

4. A direct current forward biased, electroluminescent, diode device comprising a body of n-type zinc sulfide material having two opposite surfaces, and having a resistivity less than 100 ohm cm, a band gap of at least 3.0 eV, and a free carrier concentration of at least $10^{15}$ electrons per cubic centimeter, an electron injecting contact means formed on one of said two opposite surfaces for injecting electrons into said body, means forming a hole injecting contact on the other of said two opposite surfaces for injecting holes into said body, and said body of zinc sulfide having a chemically formed electron trapping barrier layer in the material of said body immediately adjacent said hole injecting contact for reducing electron flow into said hole injecting contact means, said electron trapping layer including metal atom recombination centers and having a thickness of less than 1,000 angstroms.

5. A diode device as recited in claim 4 wherein said metal atoms in said electron trapping layer are silver metal atoms.

6. A diode device as recited in claim 4 wherein said means forming an electron trapping layer contains a concentration of at least $10^{17}$ cm$^{-3}$ donor atoms and a concentration of acceptor atoms on the same order.

7. A diode device as recited in claim 4 wherein said means forming an electron injecting contact includes a metal having an electronegativity as measured on the Pauling Scale of less than 1.8 eV, and the hole injecting contact means includes a metal having an electronegativity on the Pauling Scale of no less than 1.8 eV.

* * * * *